United States Patent
Rausch et al.

(10) Patent No.: US 8,248,041 B2
(45) Date of Patent: Aug. 21, 2012

(54) FREQUENCY COMPRESSION FOR AN INTERLEAVED POWER FACTOR CORRECTION (PFC) CONVERTER

(75) Inventors: Gregory J. Rausch, Minnetonka, MN (US); Michael J. Gaboury, Burnsville, MN (US); Shohei Osaka, Saitama (JP)

(73) Assignee: Polar Semiconductor Inc., Bloomington, MN (US)

( * ) Notice: Subject to any disclaimer, the term of this patent is extended or adjusted under 35 U.S.C. 154(b) by 471 days.

(21) Appl. No.: 12/617,664

(22) Filed: Nov. 12, 2009

(65) Prior Publication Data

US 2011/0110133 A1 May 12, 2011

(51) Int. Cl.
G05F 1/70 (2006.01)
G05F 1/613 (2006.01)

(52) U.S. Cl. ........... 323/207; 323/272; 323/299; 323/65

(58) Field of Classification Search .................. 323/205, 323/207, 222, 225, 271, 272, 285, 299, 300, 323/350; 363/65, 89
See application file for complete search history.

(56) References Cited

U.S. PATENT DOCUMENTS

| | | | |
|---|---|---|---|
| 5,847,548 A | 12/1998 | He et al. | |
| 5,861,734 A | 1/1999 | Fasullo et al. | |
| 5,905,369 A | 5/1999 | Ishii et al. | |
| 6,091,233 A | 7/2000 | Hwang et al. | |
| 6,222,746 B1 | 4/2001 | Kim | |
| 6,448,745 B1 | 9/2002 | Killat | |
| 6,690,589 B2 | 2/2004 | Marsh et al. | |
| 6,946,819 B2 * | 9/2005 | Fagnani et al. | 323/285 |
| 7,019,502 B2 | 3/2006 | Walters et al. | |
| 7,239,120 B2 * | 7/2007 | Adragna et al. | 323/285 |
| 7,880,453 B2 * | 2/2011 | Koo et al. | 323/272 |
| 7,884,588 B2 * | 2/2011 | Adragna et al. | 323/272 |
| 7,923,973 B2 * | 4/2011 | Odell | 323/285 |
| 8,040,121 B2 * | 10/2011 | Ishida et al. | 323/285 |
| 8,072,193 B2 * | 12/2011 | Yang et al. | 323/213 |
| 8,111,050 B2 * | 2/2012 | Sutardja et al. | 323/207 |
| 2007/0253223 A1 | 11/2007 | Neidorff et al. | |
| 2007/0253224 A1 | 11/2007 | Cohen et al. | |
| 2007/0262756 A1 | 11/2007 | Valley et al. | |
| 2007/0262823 A1 | 11/2007 | Cohen et al. | |
| 2008/0197817 A1 | 8/2008 | Colbeck et al. | |
| 2008/0316783 A1 | 12/2008 | O'Loughlin | |
| 2009/0290395 A1 | 11/2009 | Osaka | |

OTHER PUBLICATIONS

Chris Bridge and Laszlo Balogh, Understanding Interleaved Boundary Conduction Mode PFC Converters, Fairchild Semiconductor Power Seminar, 2008-2009.

Jon Harper, Improving Efficiency and Reliability Using Interleaved Boundary Conduction Mode Power Factor Correction, www.Fairchildsemi.com, Jul. 2009.

* cited by examiner

Primary Examiner — Gary L Laxton
(74) Attorney, Agent, or Firm — Kinney & Lange, P.A.

(57) ABSTRACT

A controller provides frequency compression for an interleaved power factor correction (PFC) converter that determines the ON and OFF times of each switch associated with the PFC converter to prevent operating frequencies in the audible range. The controller includes a first circuit for generating an ON time current source having a magnitude related to an amplified error signal and the monitored input voltage, and a second circuit for generating an OFF time current source having a magnitude related to the ON time current source, the monitored input voltage, and the monitored output voltage. Gate drive circuitry provides gate drives signals to the switches of the interleaved PFC converter at a frequency determined by magnitudes of the ON time current source and the OFF time current source.

9 Claims, 5 Drawing Sheets

US 8,248,041 B2

FREQUENCY COMPRESSION FOR AN INTERLEAVED POWER FACTOR CORRECTION (PFC) CONVERTER

This application is related to U.S. provisional patent application Ser. No. 61/260,791, filed on even date herewith, titled "SAVING ENERGY MODE (SEM) FOR AN INTERLEAVED POWER FACTOR CORRECTION (PFC) CONVERTER", by Michael Gaboury, Gregory Rausch, and Shohei Osaka and U.S. non-provisional patent application Ser. No. 12/617,662, filed on even date herewith, titled "TIME-LIMITING MODE (TLM) FOR AN INTERLEAVED POWER FACTOR CORRECTION (PFC) CONVERTER", by Michael Gaboury, Gregory Rausch, and Shohei Osaka.

BACKGROUND

The present invention relates to power factor correction (PFC) converters, and more particularly to interleaved PFC converters.

Electric power is distributed almost universally in an alternating current (AC) format that allows for efficient transmission. Most devices however, including personal computers, televisions, etc., require direct current (DC) power. Power supplies act to convert the AC input supplied by a line to a DC output suitable for consumption by a device or load or act to convert a DC input to a DC output (i.e., a DC-to-DC converter). A switched-mode power supply (SMPS) employing a boost regulator is commonly employed in this role of AC-to-DC or DC-to-DC power conversion. A benefit of employing a SMPS having a boost regulator topology is the boost regulator can be controlled to provide power factor correction. Subsequent stages may be employed to step-down the output of the PFC boost regulator to a desired DC output voltage.

A boost regulator includes an inductor connected between an input and the DC output. A shunt switch is selectively controlled to charge the inductor (during ON times of the switch) and to discharge the inductor to the DC output (during OFF times of the switch). The power capability of a converter may be increased (or alternatively, the size of the converter decreased) by connecting boost regulators in parallel with one another and controlling them in an interleaved manner to provide the desired output.

The frequency of the boost regulator varies with the magnitude of the input and output voltages of the boost regulator. Operation at very low frequencies within the human audible range is undesirable, as it results in audible noise that is distracting to consumers. Prior art solutions employ a frequency clamp that prevents operation at frequencies in the human audible range. However, frequency clamping modifies the duty cycle of the boost regulator (i.e., the ratio of the ON time to the OFF time), which can decrease the overall efficiency of the boost regulator.

SUMMARY

A controller provides frequency compression for an interleaved power factor correction (PFC) converter that includes switches selectively turned ON and OFF to convert an input voltage to a desired output voltage. The controller includes a first circuit for generating an ON time current source having a magnitude related to an amplified error signal and the monitored input voltage. The controller further includes a second circuit for generating an OFF time current source having a magnitude related to the ON time current source, the monitored input voltage, and the monitored output voltage. Gate drive circuitry provides gate drives signals to the switches of the interleaved PFC converter at a frequency determined by magnitudes of the ON time current source and the OFF time current source. Relating the magnitude of the ON time current source to the monitored input voltage, in addition to the amplified error signal, provides the desired frequency compression of the PFC converter.

DETAILED DESCRIPTION

The present invention provides a system and method of providing frequency compression for an interleaved power factor correction (PFC) converter that determines the ON and OFF times of each switch associated with the PFC converter to prevent operating frequencies in the audible range, without sacrificing performance of the interleaved PFC converter. In particular, the present invention provides the desired frequency compression while maintaining a constant duty cycle ratio that ensures the desired performance of the PFC converter.

Figure 1:
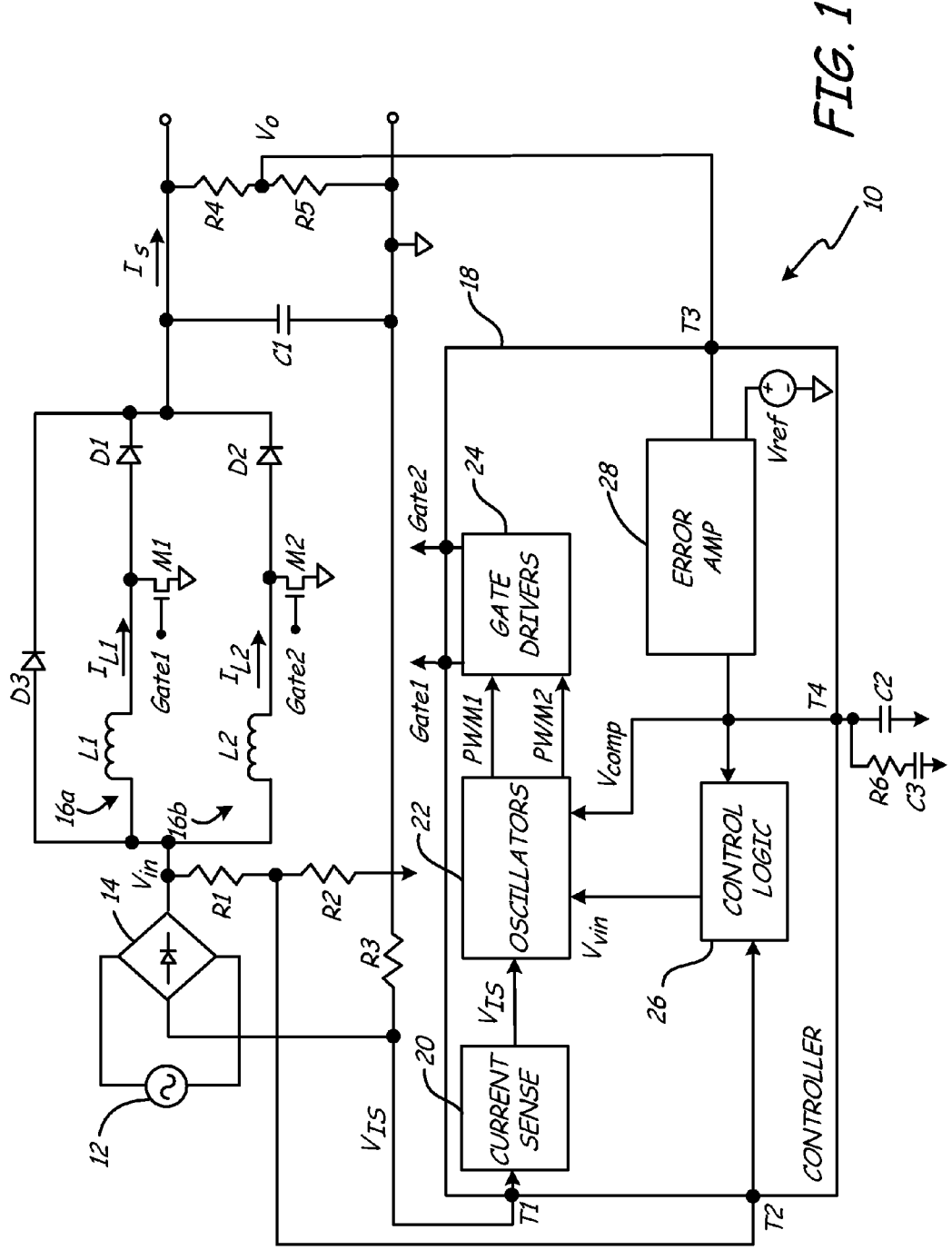
FIG. 1 is a circuit diagram of a two-phase interleaved power factor correction (PFC) circuit according to an embodiment of the present invention.

FIG. 1 is a circuit diagram illustrating interleaved power factor correction (PFC) circuit 10 according to an embodiment of the present invention. Interleaved PFC converter 10 is connected to receive alternating current (AC) power from AC power supply 12. PFC converter 10 includes rectifier circuit 14, first PFC sub-circuit 16a, which includes inductor L1, transistor M1, and diode D1, second PFC sub-circuit 16b, which includes inductor L2, transistor M2, and diode D2, capacitors C1, C2, and C3, resistors R1, R2, R3, R4, R5, and R6, diode D3, and controller 18, which includes current sense circuit 20, oscillator circuit 22, gate drive circuit 24, control logic 26 and error amplifier circuit 28.

In the embodiment shown in FIG. 1, interleaved PFC converter 10 is comprised of two PFC sub-circuits 16a and 16b, connected in parallel with one another to convert alternating current (AC) input provided by AC source 12 and rectified by rectifier circuit 14 to the desired DC output voltage Vo. Transistors M1 and M2 are selectively turned ON and OFF to charge and discharge inductors L1 and L2, respectively. For example, when transistor M1 is ON, rectified input voltage $V_{in}$ provides charging power to inductor L1. When transistor M1 is OFF, energy stored in inductor L1 is discharged through diode D1 to output voltage $V_o$. Resistors R1 and R2 form a voltage divider for providing a voltage signal proportional to the input voltage $V_{in}$. Similarly, resistors R4 and R5 form a voltage divider for providing a voltage signal proportional to the output voltage Vo. Resistor R3 is connected to provide a voltage signal $V_{Is}$ proportional to the inductor current Is (i.e., the sum of inductor currents $I_{L1}$ and $I_{L2}$).

Controller 18 includes input terminals T1, T2, T3, and T4 for monitoring the operation of PFC converter 10 and output terminals Gate1 and Gate2 for providing gate drive signals to transistors M1 and M2. In particular, controller 18 ensures operation in a discontinuous conduction mode (DCM) in which each inductor L1 and L2 is completely discharged before beginning the next charge/discharge cycle. In prior art embodiments, DCM mode is ensured by separately monitoring the current through inductor L1 and L2. In the embodiment shown in FIG. 1, controller 18 monitors inputs provided at input terminals T1, T2, T3 and T4 and in response calculates the appropriate ON and OFF times of each PFC sub-circuit.

As shown in FIG. 1, input terminal T1 receives a voltage signal $V_{Is}$ representative of the summed inductor currents Is. Input terminal T2 receives a voltage signal representative of the rectified input voltage $V_{in}$ provided as an input to interleaved PFC converter 10 and input terminal T3 receives a voltage signal representative of the output voltage $V_o$ provided by PFC converter 10. Input terminal T4 provides an amplified error signal that reflects differences between the monitored output voltage $V_o$ and a reference voltage $V_{ref}$.

Current sense circuit 20 generates signal $V_{IS}$ representing the inductor current Is based on the voltage signal provided to input terminal T1. Likewise, error amplifier circuit 28 generates an output based on differences between the signal representing the monitored output voltage $V_o$ provided at input terminal T3 and the reference voltage $V_{ref}$. The output of error amplifier circuit 28 is modified by input terminal T4 and an associated filter network (comprised of resistor R6 and capacitors C2 and C3) to generate the amplified error signal $V_{comp}$ provided to oscillator circuit 22 and control logic 26.

Oscillator circuit 22 generates PWM signals (PWM$_1$, PWM$_2$) provided to gate driver circuit 24 that dictate the ON and OFF cycles of transistors M1 and M2, respectively, to ensure DCM operation in which each inductor is fully discharged before the next charging cycle can begin. In particular, this requires oscillator circuit 22 to ensure that inductor current has fallen to zero before turning ON a transistor associated with the inductor.

U.S. application Ser. No. 12/428,557 (titled "Power Factor Converter Circuit"), filed Apr. 23, 2009 and claiming priority to Japanese Appln. No. 2008/134539JP, filed May 22, 2008, Assigned to Sanken Electric Co., Ltd., incorporated by reference herein, describes in more detail a controller that detects inductor current zero crossings based on the monitored input voltage and monitored output voltage (as opposed to directly monitoring the event through each inductor). In one disclosed embodiment, the ON time of the switch element is defined as proportional to an amplified error signal $V_{comp}$ and the OFF time of the switch element is based on a comparison between the result of calculations performed on the monitored input voltage $V_{in}$, the monitored output voltage $V_o$, and the monitored amplified error signal $V_{comp}$. In another embodiment, the ON time of the switch element is set based on a comparison between an integrated value of the input voltage signal $V_{in}$ and calculations performed on the monitored input voltage $V_{in}$ and the amplified error signal, and the OFF time is set based on a comparison between the result of calculations performed on the monitored input voltage $V_{in}$ and the amplified error signal $V_{comp}$ and an integrated value of differences between the output voltage $V_o$ signal and the input voltage signal $V_{in}$. In this way, the controller is able to control the interleaved converter in a discontinuous conduction mode (DCM) without direct monitoring of the currents through inductors L1 and L2 (as shown in FIG. 1).

Figure 2:
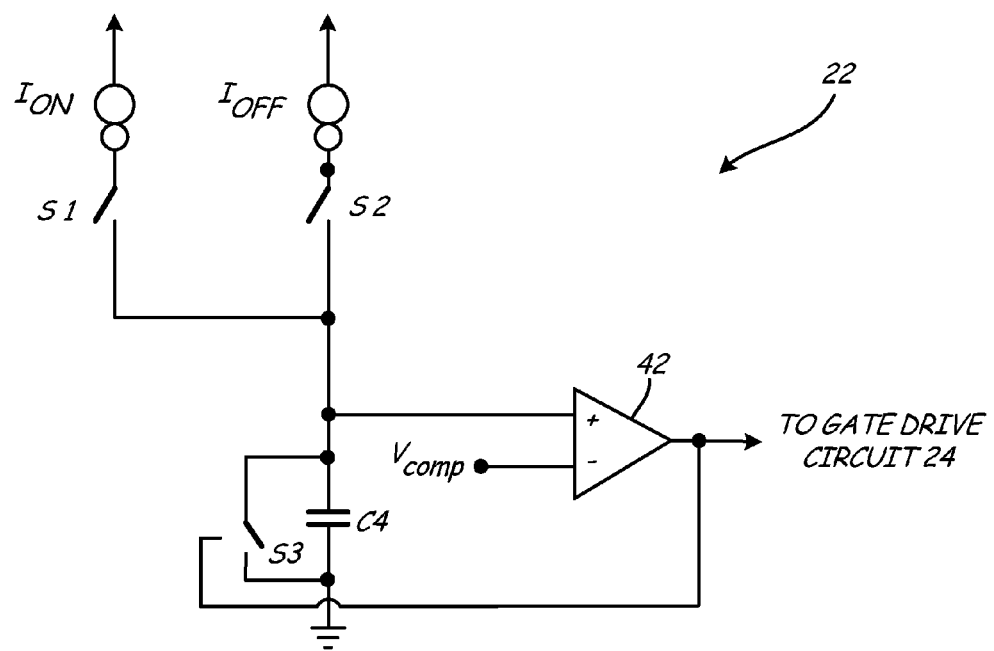
FIG. 2 is a simplified circuit diagram illustrating oscillator circuitry for generating the desired gate drive signals in normal modes of operation and time-limiting modes (TLM) of operation according to an embodiment of the present invention.

FIG. 2 is a simplified circuit schematic illustrating operations performed by oscillator circuit 22 in generating control signal PWM1 (which in turn is employed to generate gate drive signal Gate1). For the sake of simplicity, only one channel is illustrated, although identical components would be provided to generate the control signal PWM2. In this embodiment, oscillator circuit 22 includes switches S1 and S2, comparator circuit 40, and current sources labeled $I_{ON}$ and $I_{OFF}$. The magnitude of current sources $I_{ON}$ and $I_{OFF}$ dictate the duration of the ON and OFF times of each switch. In this embodiment, current sources $I_{ON}$ and $I_{OFF}$ generate currents having magnitudes related to the monitored inputs, as defined by the following equations:

$$I_{ON} = \frac{K}{Vcomp} \qquad \text{Equation 1}$$

$$I_{OFF} = \frac{Vo - V_{in}}{V_{in}} * I_{ON} \qquad \text{Equation 2}$$

Thus, the magnitude of the current source $I_{ON}$ is related only to the amplified error signal $V_{comp}$. The magnitude of the current source $I_{OFF}$ is related to the monitored output voltage $V_O$, the monitored input $V_{in}$, and the magnitude of the current source $I_{ON}$ (i.e., the ON time).

As shown in FIG. 2, the current sources $I_{OFF}$ and $I_{ON}$ are connected to selectively charge capacitor C4 through switches S1 and S2, respectively. The ON time of the transistor (e.g., transistor M1) is based on the time required for current source $I_{ON}$ to charge capacitor C4. Following charging by current source $I_{ON}$, the capacitor is quickly discharged by closing switch S3. The OFF time of the transistor is based on the time required for current source $I_{OFF}$ to charge capacitor C4. Additional logic (such as a latch circuit) connected at the output of comparator 42 generates the corresponding train of PWM signals provided to gate drive circuit 24 and provides feedback pulses to switch S3 to discharge capacitor C4 after each charge/discharge cycle. In other embodiments the capacitor is charged by current source $I_{ON}$ and discharged by current source $I_{OFF}$, wherein the OFF time is determined by the time required for current source $I_{OFF}$ to discharge the capacitor (e.g., in one embodiment, a separate comparator is employed to determine when the capacitor has been sufficiently discharged by current source $I_{OFF}$).

As the magnitude of the input voltage $V_{in}$ increases, the magnitude of the current source $I_{OFF}$ decreases, resulting in longer ON and OFF times and therefore lower frequencies. For very high input voltages (e.g., 265 V), the frequency becomes increasingly small, potentially resulting in frequencies within the audible frequency range. The present invention modifies the magnitude of the current source $I_{ON}$ by further relating the current source $I_{ON}$ to the monitored input voltage $V_{in}$. This modification provides frequency compression that increases the frequency at the low end of the spectrum (i.e. low frequencies) without substantially affecting frequencies at the high end of the spectrum.

Figure 3:
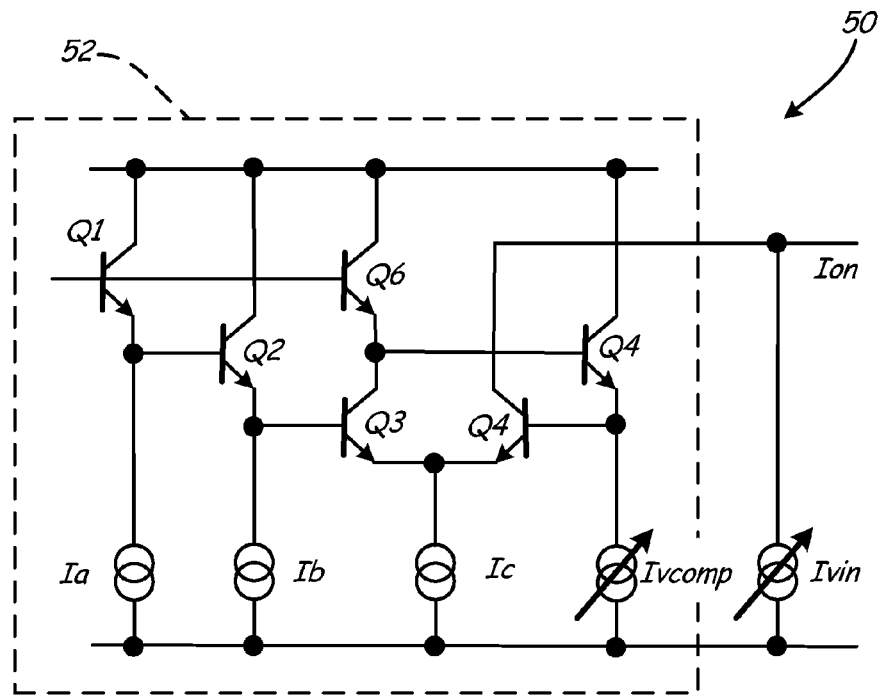
FIG. 3 is a circuit diagram illustrating circuitry for generating the current source $I_{ON}$ according to an embodiment of the present invention.
Figure 4A:
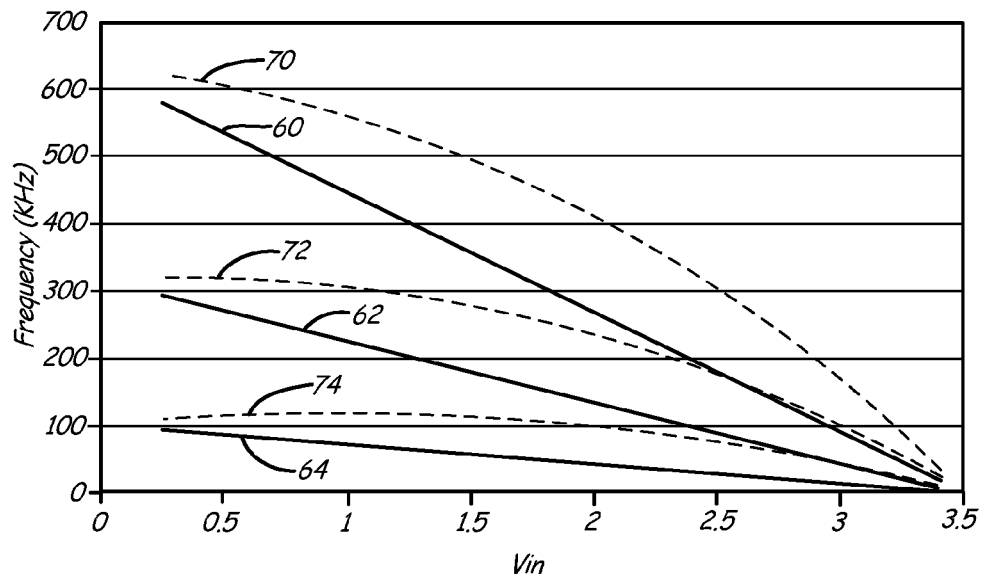
FIGS. 4A and 4B are graphs illustrating frequency range compression achieved with the circuitry illustrated in FIG. 3.
Figure 4B:
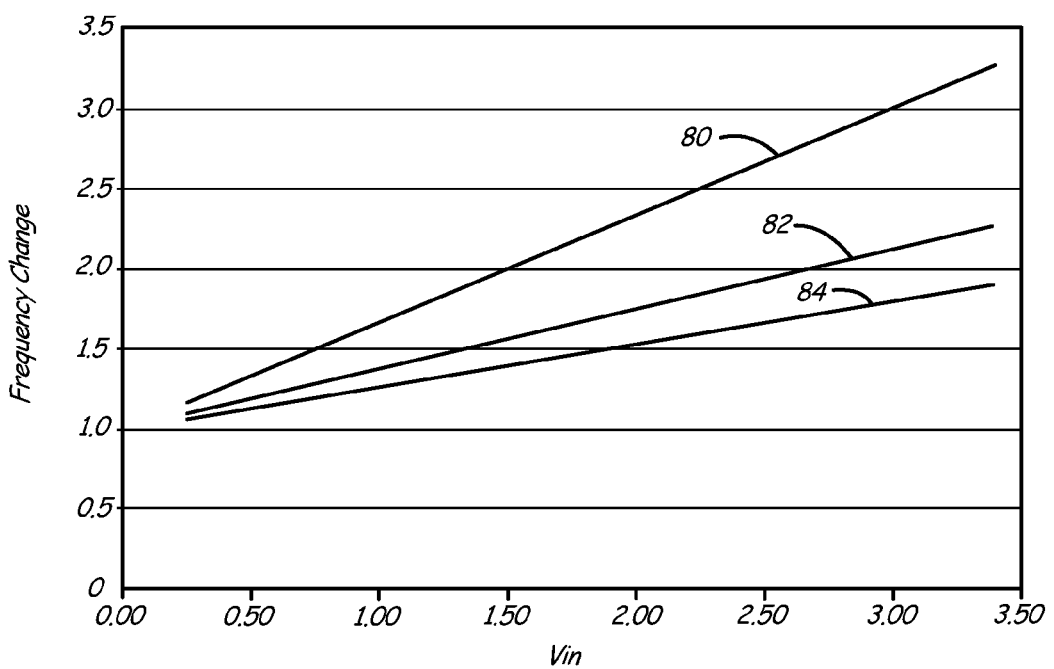

FIG. 3 is a circuit diagram illustrating circuitry 50 for generating the current source $I_{ON}$ according to an embodiment of the present invention. FIGS. 4A and 4B are graphs illustrating the relationship between the input voltage and frequency, and the resulting frequency compression provided by the embodiment of the present invention shown in FIG. 3.

As provided by Equation 1 above, the magnitude of the current source $I_{ON}$ is typically related only to the amplified error signal Vcomp. An example of circuitry employed to generate the current source $I_{ON}$ in this manner is illustrated by circuitry 52, which includes transistors Q1, Q2, Q3, Q4, Q5 and Q6, constant current sources Ia, Ib, Ic, and variable current source $I_{V_{comp}}$. Circuitry 52 generates a current source $I_{ON}$ having a magnitude that is related to the magnitude of variable current source $I_{V_{comp}}$. The present invention modifies the magnitude of the current source $I_{ON}$ by adding an additional variable current source $I_{Vin}$ related to the magnitude of the monitored input voltage $V_{in}$.

In the embodiment shown in FIG. 3, variable current source $I_{Vin}$ is connected directly to the output provided by circuitry 52. As a result, the current source $I_{ON}$ is a sum of the current provided by circuitry 52 related to the variable current source Vcomp and the variable current source $I_{Vin}$ related to the monitored input voltage $V_{in}$ as shown in Equation 3.

$$I_{ON} = \frac{Ia * Ib}{Vcomp/Ra} + \frac{V_{in}}{Rb} \quad \text{Equation 3}$$

The terms Ia and Ib represent constant current sources and the terms Ra and Rb represent resistance values that in combination with voltage signals Vcomp and Vin are represented by variable current sources Ivcomp and Ivin, respectively. Replacing the term Ia*Ib*Ra with the constant K provides:

$$I_{ON} = \frac{K}{Vcomp} + \frac{V_{in}}{Rb} \quad \text{Equation 4}$$

The addition of variable current source $I_{Vin}$ (e.g., Vin/Rb) in the location shown in FIG. 3 results in a simple summing of the current source $I_{ON}$ generated by circuitry 52 with the current source related to the monitored input voltage. Thus, as compared to Equation 1, Equation 4 simply adds the component Vin/Rb (i.e. the variable current source $I_{Vin}$) to the K/Vcomp current component.

As discussed above, the amplified error signal Vcomp is a function of the monitored input voltage $V_{in}$ and the inductor current $I_s$. Increases in the input voltage $V_{in}$ result in the magnitude of the current source $I_{ON}$ decreasing (according to Equation 1), causing a corresponding decrease in the frequency of PFC converter 10. By adding the component related to the monitored input voltage $V_{in}$, the magnitude of the current source $I_{ON}$ is increased, resulting in a corresponding increase in the frequency of PFC converter 10. Furthermore, the increase is proportional to the magnitude of the monitored input voltage $V_{in}$. The frequency is therefore modified most significantly at lower frequencies when the monitored input voltage is greater. In addition, because the current source $I_{OFF}$ (provided in Equation 2, above) is related to current source $I_{ON}$, modifications to the current source $I_{ON}$ will result in a corresponding modification of the current source $I_{OFF}$. As a result of modifications affecting both the ON times and the OFF times, the overall duty cycle (i.e., the ratio of the ON time to the OFF time) remains relatively constant.

FIGS. 4A and 4B are graphs illustrating the relationship between the input voltage and frequency, and the resulting frequency compression provided by the embodiment of the present invention shown in FIG. 3.

FIG. 4A illustrates the relationship between the monitored input voltage (x-axis) and the frequency of interleaved PFC converter 10 (y-axis). Solid lines 60, 62 and 64 represent the frequency-input voltage relationship when the current source $I_{ON}$ is calculated as shown in Equation 1 (i.e., without providing the component related to the monitored input voltage) at various Vcomp values. Dashed lines 70, 72 and 74 represent the frequency-input voltage relationship when the current source $I_{ON}$ is calculated as shown in Equation 3 (i.e., with the addition of current source $I_{Vin}$ shown in FIG. 3) at various Vcomp values. For each value of error amplifier signal Vcomp, the addition of current source $I_{Vin}$ to the calculation of current source $I_{ON}$ (represented by dashed lines 70, 72 and 74) results in an increase to the frequency as compared with an embodiment that does not employ current source $I_{Vin}$.

FIG. 4B illustrates the magnitude of the frequency compression provided by modifying the current source $I_{ON}$ based on the monitored input voltage $V_{in}$ (i.e., as shown in Equation 3) over embodiments that do not relate the magnitude of the current source $I_{ON}$ to the monitored input voltage Vin. For example, line 80 represents the frequency-input voltage relationship illustrated by line 74 (shown in FIG. 4A) being divided by the frequency-input voltage relationship illustrated by line 64 (also shown in FIG. 4A). Likewise, line 82 represents the frequency-input voltage relationship illustrated by line 72 being divided by the frequency-input voltage relationship illustrated by line 62 and line 84 represents the frequency-input voltage relationship illustrated by line 70 being divided by the frequency-input voltage relationship represented by line 60.

In particular, FIG. 4B illustrates that the present invention increases the frequency most significantly at higher values of the monitored input voltage Vin (i.e., when the frequency is low). The present invention impacts the frequency least significantly at lower values of the monitored input voltage Vin (i.e., when the frequency is high). The resulting frequency compression therefore increases the frequency at the low end of the spectrum sufficiently to prevent operation in the human audible range, while minimizing the effect on frequency at the high end of the spectrum, therefore maintaining the desired efficiency of the PFC converter.

For example, line 80 indicates that at the high end of the frequency spectrum, the present invention only increases the frequency by a factor of about 1.25, but at the low end of the spectrum, the present invention increases the frequency by a factor of 3. For other values of Vcomp shown by lines 82 and 84, the present invention similarly only increases the frequency by a factor of about 1.25 at the high end of the frequency spectrum, but increases the frequency by factor of approximately 2 at the low end of the frequency spectrum, thus providing the desired frequency compression.

Figure 5:
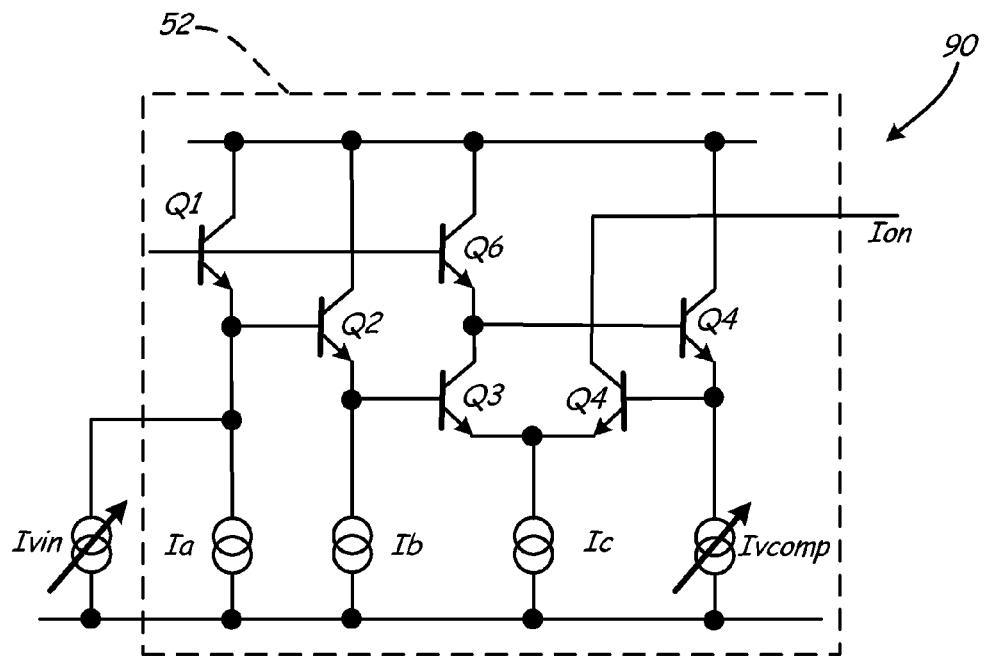
FIG. 5 is circuit diagram illustrating circuitry for generating the current source $I_{ON}$ according to another embodiment of the present invention.

FIG. 5 is a circuit diagram illustrating circuitry 90 for generating the current source $I_{ON}$ according to another embodiment of the present invention. FIGS. 6A and 6B once again are graphs illustrating the relationship between the input voltage and frequency, and the resulting frequency compression provided by the embodiment of the present invention shown in FIG. 5.

Circuitry 52 once again represents the circuitry employed to generate the current source $I_{ON}$ as described by Equation 1. In the embodiment shown in FIG. 5, variable current source $I_{Vin}$ is connected in parallel with constant current source Ia. As a result, the current source $I_{ON}$ is related to the monitored input voltage $V_{in}$ and the error amplifier signal Vcomp by the following equation.

$$I_{ON} = \left(Ia + \frac{V_{in}}{Rb}\right) * \frac{Ib}{Vcomp/Ra} \quad \text{Equation 5}$$

As compared with Equation 3, the addition of the term Vin/Ra (i.e., variable current source $I_{Vin}$) once again results in the magnitude of the current source $I_{ON}$ increasing as the monitored input voltage increases. However, the position of variable current source $I_{Vin}$ shown in FIG. 5 results in an increase in frequency that is independent of the value of the amplified error signal Vcomp. In addition, because current source $I_{OFF}$ (provided in Equation 2, above) remains related to current source $I_{ON}$, modifying current source $I_{ON}$ modifies the frequency of interleaved PFC converter 10 without modifying the duty cycle of PFC converter 10. That is, both the ON time and the OFF time (which depend on the magnitude of the current sources $I_{ON}$ and $I_{OFF}$) is modified such that the ratio of the ON time to the OFF time remains the same.

Figure 6A:
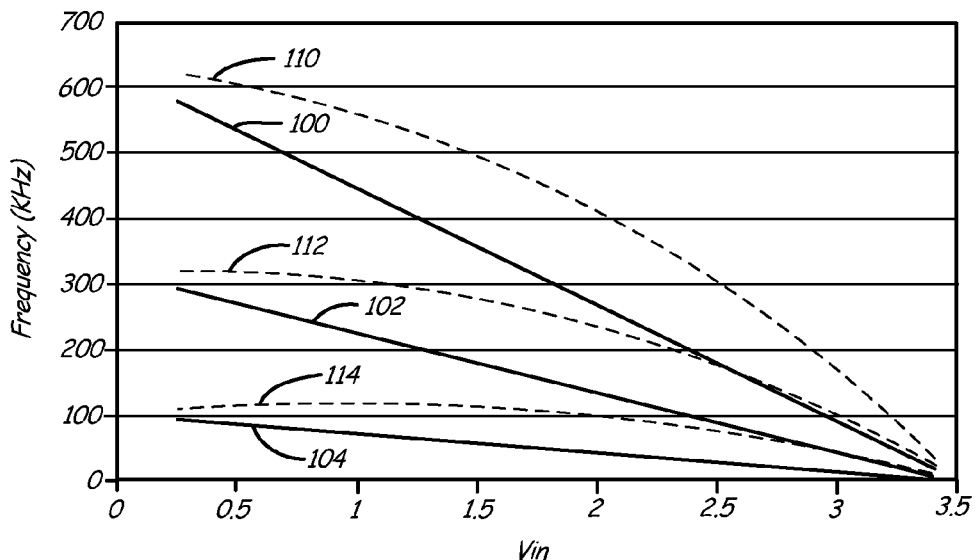
FIGS. 6A and 6B are graphs illustrating frequency range compression achieved with the circuitry illustrated in FIG. 5.

FIG. 6A illustrates the relationship between the monitored input voltage (x-axis) and the frequency of interleaved PFC converter 10 (y-axis). Solid lines 100, 102 and 104 represent the frequency-input voltage relationship when the current source $I_{ON}$ is calculated as shown in Equation 1 (i.e., without providing the component related to the monitored input voltage) at various Vcomp values. Dashed lines 110, 112 and 114 represent the frequency-input voltage relationship when the current source $I_{ON}$ is calculated as shown in Equation 5 (i.e., with the addition of current source $I_{Vin}$ shown in FIG. 5) at various Vcomp values. For each value of error amplifier signal Vcomp, the addition of current source $I_{Vin}$ to the calculation of current source $I_{ON}$ (represented by dashed lines 110, 112 and 114) results in an increase to the frequency as compared with an embodiment that does not employ current source $I_{Vin}$.

Figure 6B:
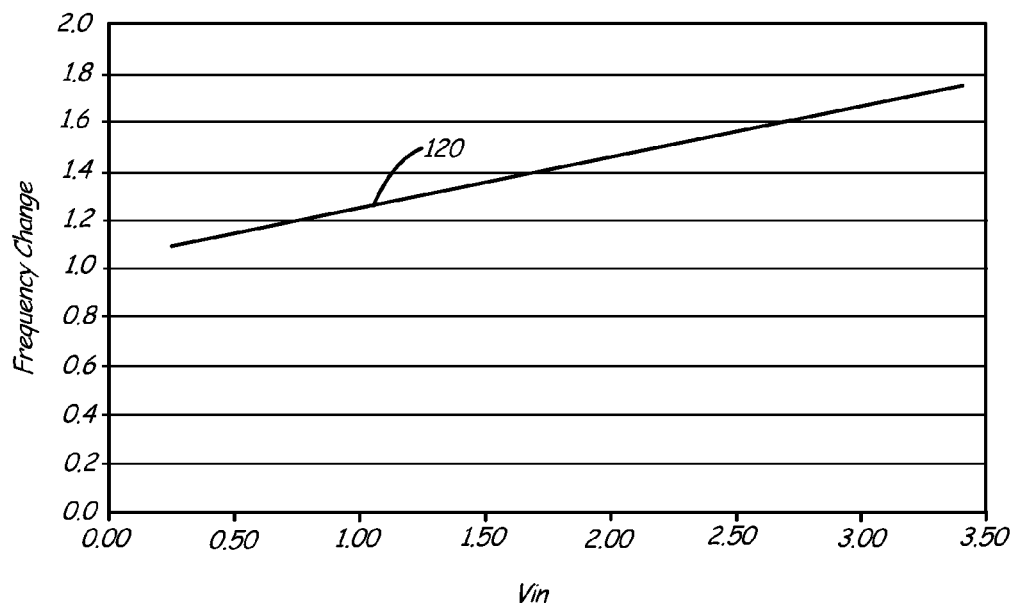

FIG. 6B illustrates the resulting change in frequency effected by modifying the current source $I_{ON}$ based on the monitored input voltage $V_{in}$ (i.e., as shown in Equation 5) over embodiments that do not relate the magnitude of the current source $I_{ON}$ to the monitored input voltage Vin. In contrast with FIG. 4B, in which the change in frequency depended on the magnitude of the amplified error signal Vcomp, the embodiment shown in FIG. 5 results in the same change in frequency regardless of the value of the amplified error signal Vcomp. That is, line 120 represents the frequency-voltage relationship illustrated by line 110 (as shown in FIG. 6A) being divided by the frequency-voltage relationship illustrated by line 100 (also shown in FIG. 6A), as well as the frequency-voltage relationship illustrated by line 112 being divided by the frequency-voltage relationship illustrated by line 102, and the frequency-voltage relationship of line 114 being divided by the frequency-voltage relationship illustrated by line 104.

FIG. 6B illustrates that this embodiment of the present invention once again has the greatest impact on frequency at higher values of the monitored input voltage Vin. For example, line 120 indicates that at the high end of the frequency spectrum, the embodiment of the present invention shown in FIG. 5 only increases the frequency by a factor of about 1.25, while at the low end of the frequency spectrum the frequency is increased by a factor of about 1.7. As a result, the embodiment of the present invention described with respect to FIG. 5 provides the desired frequency compression without affecting the overall efficiency of PFC converter 10.

While the invention has been described with reference to an exemplary embodiment(s), it will be understood by those skilled in the art that various changes may be made and equivalents may be substituted for elements thereof without departing from the scope of the invention. In particular, portions of the invention have been described with respect to analog circuits, but in other embodiments digital circuits and/or processors employing a combination of hardware and software may be employed to implement the described functions. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A controller for an interleaved power factor correction (PFC) converter that includes switches selectively turned ON and OFF to convert an input voltage to a desired output voltage, the controller comprising:
    input terminals for monitoring an input voltage of the PFC converter, an output voltage of the PFC converter, a sum of inductor currents, and an amplified error signal that is based on the monitored output voltage;
    a first circuit for generating an ON time current having a magnitude related to the amplified error signal and the monitored input voltage;
    a second circuit for generating an OFF time current having a magnitude related to the ON time current, the monitored input voltage, and the monitored output voltage; and
    gate drive circuitry that provides gate drive signals to the switches of the interleaved PFC converter at a frequency determined by magnitudes of the ON time current and the OFF time current.

2. The controller of claim 1, wherein the magnitude of the ON time current is defined by the equation $$I_{ON} = \frac{K}{Vcomp} + \frac{V_{in}}{Rb},$$

where $I_{ON}$ is the magnitude of the ON time current, K and Rb are constant values, Vcomp is the amplified error signal, and $V_{in}$ is the monitored input voltage.

3. The controller of claim 1, wherein the magnitude of the ON time current is defined by the equation $$I_{ON} = \left(Ia + \frac{V_{in}}{Rb}\right) * \frac{Ib}{Vcomp/Ra},$$

where $I_{ON}$ is the magnitude of the ON time current, Ia, Ib, Ra and Rb are constants, Vcomp is the amplified error signal, and $V_{in}$ is the monitored input voltage.

4. The controller of claim 1, wherein the controller does not include terminals for monitoring individual currents through two or more inductors associated with the interleaved PFC converter.

5. An interleaved power factor correction (PFC) circuit comprising:
    a rectifier circuit for converting an alternating current (AC) voltage to a rectified input voltage;
    a first power factor correction (PFC) sub-circuit having a first inductor and a first switching device, the first inductor connected to store energy provided by the rectified input voltage when the first switching device is ON and to discharge stored energy to a direct current (DC) output when the first switching device is OFF;
    a second power factor correction (PFC) sub-circuit connected in parallel with the first PFC sub-circuit and having a second inductor and a second switching device, the second inductor connected to store energy provided by the rectified input voltage when the second switching device is ON and to discharge stored energy to the DC output voltage when the second switching device is OFF; and a controller that provides gate drive signals to the first switching device and the second switching device to define ON and OFF times of each switching device to ensure operation of the interleaved PFC converter in a discontinuous conduction mode (DCM) based on inputs that include a monitored input voltage, a monitored output voltage, a monitored sum of currents through the first and second PFC sub-circuits, and an amplified error signal that is related to the monitored output voltage, the controller provides frequency compression by relating the ON time of each switching device to the amplified error signal and the monitored input voltage, and the OFF time of each switch to the monitored input voltage, the monitored output voltage, and the ON time.

6. The interleaved PFC converter of claim 5, wherein for each gate drive signal the controller includes:
a current source $I_{ON}$ having a magnitude related to the amplified error signal and the monitored input voltage;
a current source $I_{OFF}$ having a magnitude related to the rectified input voltage, the monitored output voltage, and the current source $I_{ON}$;
at least one capacitor;
a first comparator having a first input connected to a first voltage reference value and a second input connected to the capacitor, wherein the comparator generates a signal indicating when a capacitor voltage exceeds the voltage reference; and
wherein during a time required for the current source $I_{ON}$ to increase the capacitor voltage to a value greater than the voltage reference represents the ON time of the switching device and a time required for the current source $I_{OFF}$ to increase the capacitor voltage to a value greater than the voltage reference represents the OFF time of the switching device.

7. A method of controlling an interleaved power factor correction (PFC) converter by calculating an ON time of the PFC converter based on an amplified error signal and calculating an OFF time of the PFC converter based on a monitored input voltage, a monitored output voltage, the calculated ON time, and the amplified error signal, wherein the improvement comprises:
calculating the ON time of the PFC converter based in addition on the monitored input voltage to provide frequency compression of the interleaved PFC converter.

8. The method of claim 7, wherein calculating the ON time of the PFC converter is defined by the equation $$I_{ON} = \frac{K}{Vcomp} + \frac{V_{in}}{Rb},$$

where $I_{ON}$ is the magnitude of an ON time current source, K is a constant, Rb is a resistance value, Vcomp is the amplified error signal, and $V_{in}$ is the monitored input voltage.

9. The method of claim 7, wherein calculating the ON time of the PFC converter is defined by the equation $$I_{ON} = \left(Ia + \frac{V_{in}}{Rb}\right) * \frac{Ib}{Vcomp/Ra},$$

where $I_{ON}$ is the magnitude of an ON time current source, Ia and Ib are constant current sources, Ra and Rb are resistance values, Vcomp is the amplified error signal, and $V_{in}$ is the monitored input voltage.

* * * * *